(12) United States Patent
Lin et al.

(10) Patent No.: US 8,566,486 B2
(45) Date of Patent: Oct. 22, 2013

(54) CONTROLLING APPARATUS AND DATA TRANSMITTING SYSTEM APPLYING THE CONTROLLING APPARATUS AND METHOD THEREOF

(75) Inventors: Jui-Yuan Lin, Chiayi County (TW); Yen-Ju Lu, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 227 days.

(21) Appl. No.: 13/187,537

(22) Filed: Jul. 21, 2011

(65) Prior Publication Data

US 2012/0023299 A1 Jan. 26, 2012

(30) Foreign Application Priority Data

Jul. 21, 2010 (TW) .................................. 99123942 A

(51) Int. Cl.
*G06F 3/00* (2006.01)
*G06F 13/00* (2006.01)
*G06F 12/00* (2006.01)

(52) U.S. Cl.
USPC ............... 710/33; 710/30; 710/107; 711/154

(58) Field of Classification Search
USPC ............................... 710/33, 30, 107; 711/154
See application file for complete search history.

(56) References Cited

U.S. PATENT DOCUMENTS

| 5,535,373 | A | * | 7/1996 | Olnowich ........................ 703/25 |
| 6,047,001 | A | * | 4/2000 | Kuo et al. ........................ 370/428 |
| 7,000,045 | B2 | | 2/2006 | Holm |
| 2004/0044812 | A1 | | 3/2004 | Holm et al. |

OTHER PUBLICATIONS

Open Core Protocol Specification, Release 1.0, 2001.*
"Open Core Protocol Specification"; OCP International Partnership; Release 1.0; copyright 2001 OCP-IP Association.

* cited by examiner

*Primary Examiner* — Farley Abad
(74) *Attorney, Agent, or Firm* — McClure, Qualey & Rodack, LLP

(57) ABSTRACT

A controlling apparatus includes: a storage device arranged for storing at least one Byte Enable property compatible to a processing device; and a controlling circuit coupled to the storage device for generating at least one Byte Enable signal to the processing device according to the Byte Enable property compatible with the processing device.

17 Claims, 5 Drawing Sheets

| First processing device 106 | First address range(00-3f) |
|---|---|
| Second processing device 108 | Second address range(40-ff) |
| ⋮ | ⋮ |

CONTROLLING APPARATUS AND DATA TRANSMITTING SYSTEM APPLYING THE CONTROLLING APPARATUS AND METHOD THEREOF

BACKGROUND

1. Technical Field

The disclosure relates to a controlling apparatus, a data transmitting system applying the controlling apparatus and a method thereof.

2. Description of the Prior Art

In a circuit system, a BUS is a media utilized for providing data transmission between a first integrated circuit and a second integrated circuit. For example, a processor generates a command to a peripheral controlling circuit via the BUS. The format of the command generated by the processor should be compatible with the format of the command controlling the peripheral controlling circuit such that the peripheral controlling circuit can receive and execute the command. Due, however, to different versions of hardware made by different semiconductor processes, the processor may not be compatible with the peripheral controlling circuit when the hardware is upgraded. This may mean the command generated by the processor cannot be received by the peripheral controlling circuit. For example, when an old peripheral controlling circuit is coupled to a new processor via the BUS, the old peripheral controlling circuit may not be able to read/receive the command transmitted from the new processor successfully. If the command cannot be read by the peripheral controlling circuit successfully, the peripheral controlling circuit cannot execute and perform the operation corresponding to the command transmitted from the processor. As a result, the application of the processor is limited by the version of the peripheral controlling circuit. Therefore, how to solve the data format incompatibility between different integrated circuits is a significant concern in this field.

BRIEF SUMMARY

One of the objectives of an exemplary embodiment is to provide a controlling apparatus capable of determining a property of Byte Enable of a slave processing circuit according to an address range assigned for the slave processing circuit, and a method thereof.

According to a first embodiment, a controlling apparatus is disclosed. The controlling apparatus comprises a storage device and a controlling circuit. The storage device is arranged to store at least one Byte Enable property compatible with a processing device. The controlling circuit is coupled to the storage device, and is arranged to generate at least one Byte Enable signal to the processing device according to the Byte Enable property compatible to the processing device.

According to a second embodiment, a data transmitting system is disclosed. The data transmitting system comprises a BUS, a processing device, and a controlling apparatus. The processing device is coupled to the BUS. The controlling apparatus is coupled to the BUS, wherein when the controlling apparatus determines that a Byte Enable property compatible with the processing device is a first Byte Enable format, and when a second Byte Enable format is the format ready to be transmitted to the processing device, the controlling apparatus generates a plurality of Byte Enable signals with the first Byte Enable formats to the processing device according to the second Byte Enable format.

According to a third embodiment, a controlling method is disclosed. The controlling method comprises: arranging a storage device to store at least one Byte Enable property compatible with a processing device; and generating at least one Byte Enable signal to the processing device according to the Byte Enable property compatible with the processing device.

These and other objectives of the disclosure will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
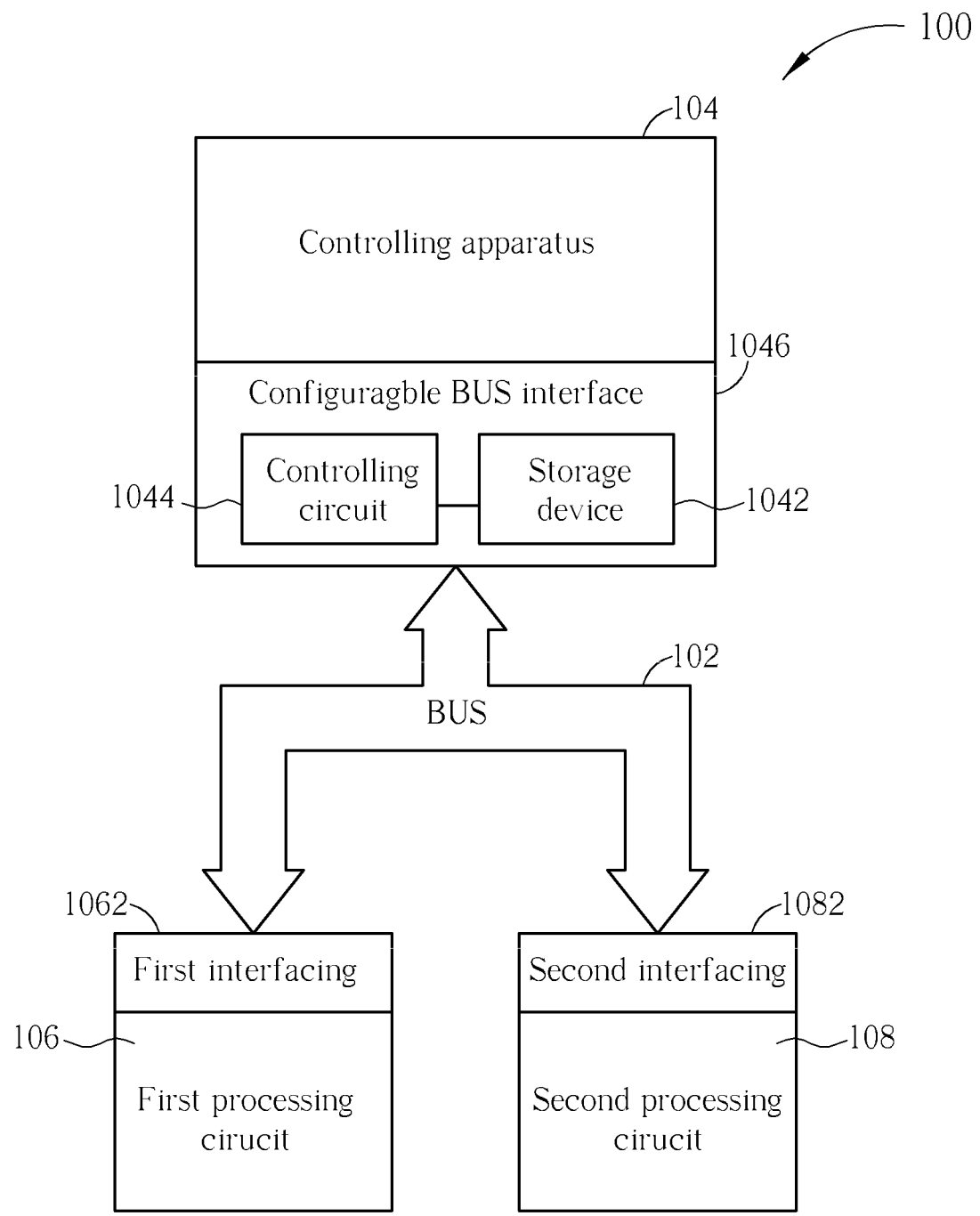
FIG. 1A is a diagram illustrating a data transmitting system according to an exemplary embodiment.

Please refer to FIG. 1A. FIG. 1A is a diagram illustrating a data transmitting system 100 according to an exemplary embodiment. The data transmitting system 100 comprises a BUS 102, a controlling apparatus 104, a first processing device 106, and a second processing device 108. The controlling apparatus 104 comprises a storage device 1042 and a controlling circuit 1044, wherein the storage device 1042 and a controlling circuit 1044 are configured as a Configurable BUS Interface 1046. In other words, the Configurable BUS Interface 1046 is integrated in the controlling apparatus 104. The first processing device 106 and the second processing device 108 are coupled to the BUS 102 via a first interfacing circuit 1062 and a second interfacing circuit 1082 respectively. The Configurable BUS Interface 1046 is also coupled to the BUS 102. The storage device 1042 is utilized to store the compatible properties of various device coupled to the BUS 102, where the compatible property may include the information regarding acceptable formats of the command of the device. In this embodiment, each device that is coupled to the BUS 102 for receiving the command of the controlling apparatus 104 comprises a processing device (i.e., the first processing device 106 and the second processing device 108), and the storage device 1042 in the Configurable BUS Interface 1046 stores the Byte Enable properties of the first processing device 106 and the second processing device 108. The controlling circuit 1044 is coupled to the storage device 1042 to generate a first Byte Enable signal and a second Byte Enable signal to the first processing device 106 and the second processing device 108 according to a first Byte Enable property of the first processing device 106 and a second Byte Enable property of the second processing device 108 respectively. It should be noted that, even though the embodiment is described as two processing devices, those skilled in this art will understand that any number of processing devices can be coupled to the controlling apparatus 104 via the BUS 102 after the appropriate modifications are made to the embodiment.

Figure 1B:
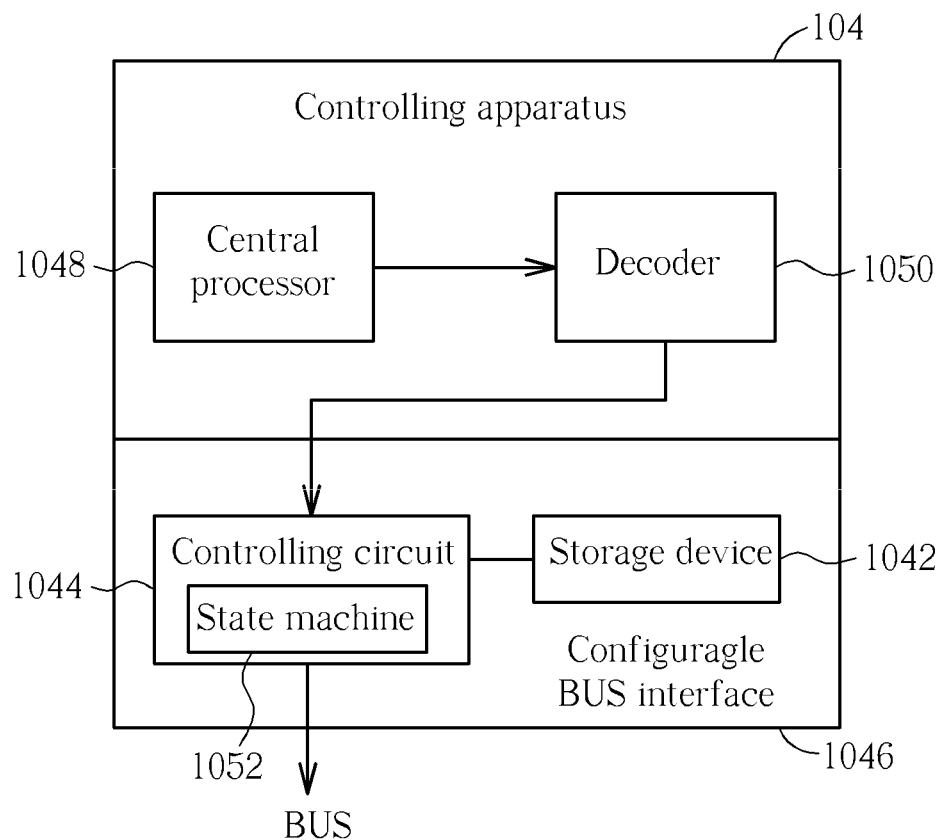
FIG. 1B is a diagram illustrating a controlling apparatus of the data transmitting system in FIG. 1A according to an exemplary embodiment.

In addition, FIG. 1B is provided to show an exemplary embodiment of the controlling apparatus 104. FIG. 1B is a diagram illustrating the controlling apparatus 104 of the data transmitting system 100 according to an exemplary embodiment. In this embodiment, the controlling apparatus 104 further comprises a central processor 1048, a decoder 1050, and a state machine 1052. The central processor 1048 is utilized for generating the information to the first processing device 106 and the second processing device 108 or processing the information generated by the first processing device 106 and the second processing device 108. The decoder 1050 is utilized for decoding the information generated by the central processor 1048 to generate a predetermined output data compatible to the BUS 102. The predetermined output data comprises the information for the first processing device 106 or the second processing device 108, and a corresponding Byte Enable signal. The state machine 1052 is installed in the controlling circuit 1044 in this embodiment, but may be coupled to the controlling circuit 1044 externally in another embodiment. The state machine 1052 is utilized for controlling the state of the controlling circuit 1044 according to the predetermined output data that is going to be transmitted to a target processing device.

Figure 2:
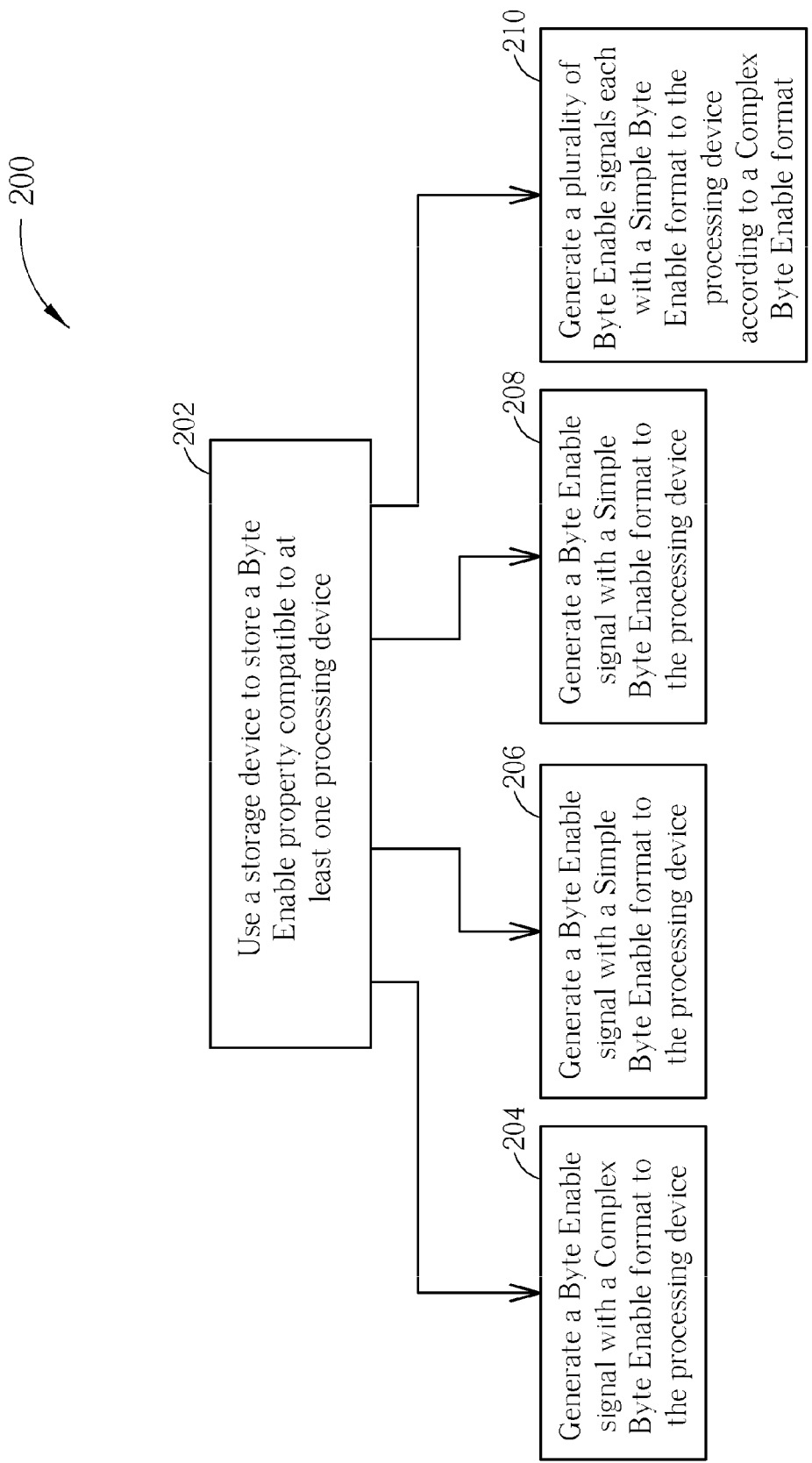
FIG. 2 is a flowchart illustrating a controlling method according to an exemplary embodiment.

When the data transmitting system 100 is under operation, the controlling apparatus 104 can be regarded as a master device, and the first processing device 106 and the second processing device 108 are regarded as the slave device. In should be noted that, in the following paragraph, the BUS 102 of the preferred data transmitting system 100 is described as an Open Core Protocol BUS, but this is not a limitation of the disclosure. Furthermore, the Byte Enable mechanism is also defined in the specifications of the Open Core Protocol BUS, and the property of Byte Enable is at least categorized into two formats, i.e., a first Byte Enable format and a second Byte Enable format. For example, the first Byte Enable format is a Simple-byte-enable format, and the second Byte Enable format is a Complex-byte-enable format. The first processing device 106 or/and the second processing device 108 may not be able to receive the signals (e.g., commands) corresponding to both of the above-mentioned Byte Enable formats, therefore the disclosure provides the controlling circuit 1044 to generate the signals having the acceptable Byte Enable format to the first processing device 106 and the second processing device 108 respectively, as shown in FIG. 2. FIG. 2 is a flowchart illustrating a controlling method 200 according to an exemplary embodiment, and the controlling method 200 can be implemented by the present controlling apparatus 104. Provided that substantially the same result is achieved, the steps of the flowchart shown in FIG. 2 need not be in the exact order shown and need not be contiguous; that is, other steps can be intermediate. The controlling method 200 comprises the following steps:

Step 202: Use the storage device 1042 to store a Byte Enable property compatible to at least one processing device, when the Byte Enable property of the processing device is the Complex Byte Enable format; when the signal corresponding to the Complex Byte Enable format is going to be transmitted to the processing device, go to step 204; when the Byte Enable property of the processing device is the Simple Byte Enable format, and when the signal corresponding to the Simple Byte Enable format is going to be transmitted to the processing device, go to step 206; when the Byte Enable property of the processing device is the Complex Byte Enable format, and when the signal corresponding to the Simple Byte Enable format is going to be transmitted to the processing device, go to step 208; when the Byte Enable property of the processing device is the Simple Byte Enable format, and when the signal corresponding to the Complex Byte Enable format is going to be transmitted to the processing device, go to step 210;

Step 204: Generate the Byte Enable signal with the Complex Byte Enable format to the processing device;

Step 206: Generate the Byte Enable signal with the Simple Byte Enable format to the processing device;

Step 208: Generate the Byte Enable signal with the Simple Byte Enable format to the processing device;

Step 210: generate a plurality of Byte Enable signals each with the Simple Byte Enable format to the processing device according to the Complex Byte Enable format.

More specifically, in this embodiment, when the controlling apparatus 104 determines that the property of Byte Enable of a processing device, e.g., the first processing device 106, is the Simple Byte Enable format, and the signal corresponding to the Complex Byte Enable format is going to be transmitted to the processing device, the controlling apparatus 104 generates a plurality of Byte Enable signals with the Simple Byte Enable format to the BUS 102 according to the Complex Byte Enable format, and transmits the plurality of Byte Enable signals to the first processing device 106 via the BUS 102. When the controlling apparatus 104 determines that the property of Byte Enable of a processing device, e.g., the second processing device 108, is the Complex Byte Enable format, and the signal corresponding to the Simple Byte Enable format is going to be transmitted to the processing device, the controlling apparatus 104 generates the Byte Enable signal with the Simple Byte Enable format to the BUS 102 as one processing device able to receive the command corresponding to the Complex Byte Enable format is also able to receive the command corresponding to the Simple Byte Enable format. Then, the BUS 102 transmits the Simple Byte Enable signal to the second processing device 108. When the controlling apparatus 104 determines that the property of Byte Enable of a processing device is the Complex Byte Enable format, and the signal corresponding to the Complex Byte Enable format is going to be transmitted to the processing device, then the controlling apparatus 104 directly generates the Byte Enable signal with the Complex Byte Enable format to the BUS 102, and the BUS 102 transmits the Complex Byte Enable signal to the processing device. Furthermore, when the controlling apparatus 104 determines that the property of Byte Enable of a processing device is the Simple Byte Enable format, and the signal corresponding to the Simple Byte Enable format is going to be transmitted to the processing device, then the controlling apparatus 104 directly generates the Byte Enable signal with the Simple Byte Enable format to the BUS 102, and the BUS 102 transmits the Simple Byte Enable signal to the processing device.

Figure 3:
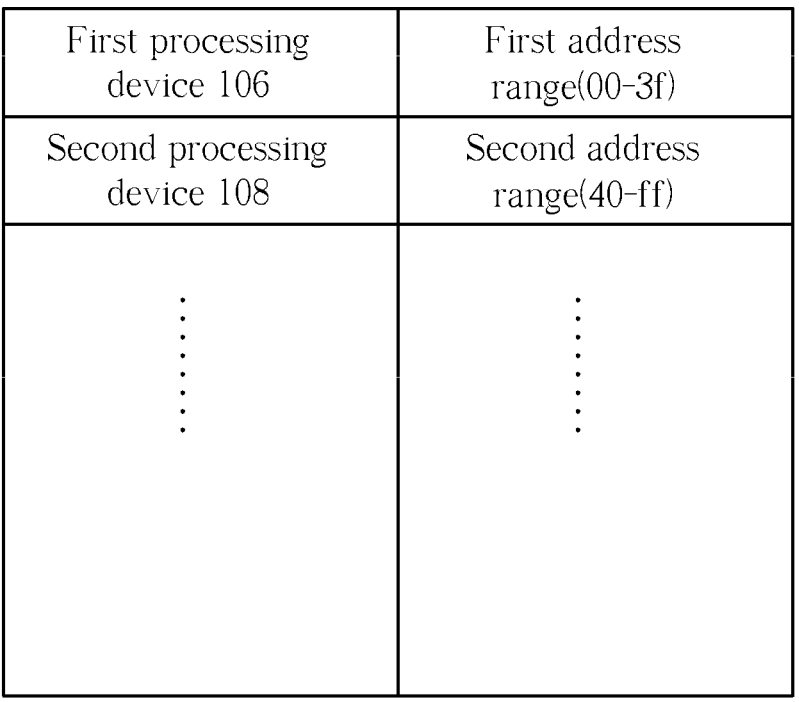
FIG. 3 is a diagram illustrating a property of Byte Enable look-up table of processing devices according to an exemplary embodiment.

Therefore, a property of Byte Enable look-up table is stored in the storage device 1042 in order to provide a look-up function for the controlling apparatus 104 as shown in FIG. 3.

FIG. 3 is a diagram illustrating a property of Byte Enable look-up table 300 of the processing device according to an exemplary embodiment, wherein the first column records the slave processing devices, and the second column records the address ranges corresponding to the respective slave processing devices. When the first processing device 106 and the second processing device 108 are coupled to the BUS 102, the address ranges corresponding to the first processing device 106 and the second processing device 108 respectively are arranged to be recorded in the Byte Enable look-up table 300. It should be noted that, normally, a master controlling circuit assigns an address range to a slave processing device according to the property of Byte Enable of the slave processing device. Therefore, the property of Byte Enable of the slave processing device can be determined according to the assigned address range of the processing device. In other words, the controlling circuit 1044 is able to determine the property of Byte Enable of a slave processing device according to the assigned address range of the slave processing device, but this is not a limitation of the disclosure. In another embodiment, when the first processing device 106 and the second processing device 108 are coupled to the BUS 102, the Byte Enable look-up table 300 may also be arranged to record the assigned address ranges of the first processing device 106 and the second processing device 108 respectively, and record the properties of Byte Enable corresponding to the assigned address ranges. Then, the controlling circuit 1044 may directly read the property of Byte Enable of a slave processing device rather than determining the property of Byte Enable of the slave processing device by the assigned address range of the slave processing device.

Accordingly, in this embodiment, when the controlling apparatus 104 receives the predetermined output data (or a command) from the decoder 1050, and when the controlling apparatus 104 is going to transmit the predetermined output data to a processing device, such as the first processing device 106, the state machine 1052 of the controlling circuit 1044 reads the property of Byte Enable of the first processing device 106 according to the first address range 00-3f of the first processing device 106. Then, the state machine 1052 controls the controlling circuit 1044 to transmit the appropriate Byte Enable signal to the first processing device 106 according to the above-mentioned controlling method 200.

Figure 4:
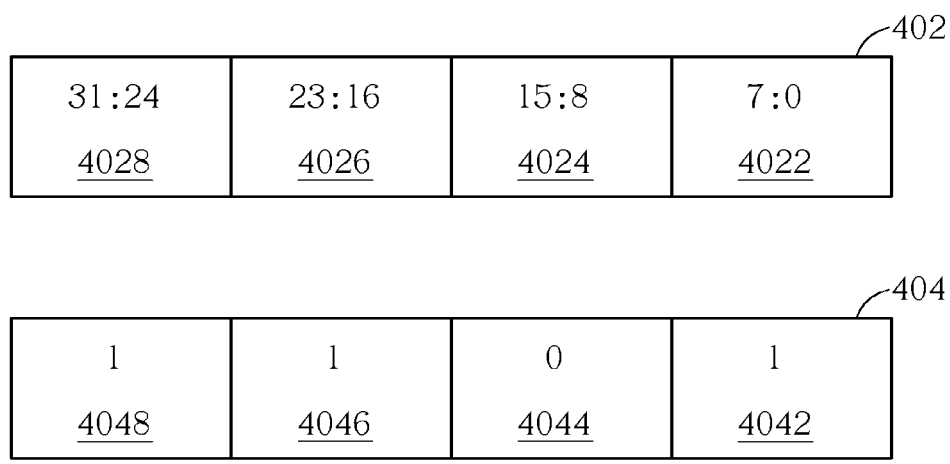
FIG. 4 is a diagram illustrating a data signal and a Byte Enable signal according to an exemplary embodiment.

The detailed operation of the embodiment is described in the following paragraph. In this embodiment, the controlling apparatus 104 is going to transmit a data signal 402 of 32 bits to a processing device, and is going to transmit a Byte Enable signal 404 of 4 bits to the processing device as shown in FIG. 4. FIG. 4 is a diagram illustrating the data signal 402 and the Byte Enable signal 404 according to an exemplary embodiment. The data signal 402 comprises 4 data bytes 4022-4028, and the Byte Enable signal 404 comprises 4 data bits 4042-4048, wherein the data bits 4042-4048 correspond to the data bytes 4022-4028 respectively. The data byte 4022 consists of the first eight bits (i.e., 0-7 bits), the data byte 4024 consists of the second eight bits (i.e., 8-15 bits), the data byte 4026 consists of the third eight bits (i.e., 16-23 bits), and the data byte 4028 consists of the fourth eight bits (i.e., 24-31 bits). When the bit value of a data bit in the Byte Enable signal 404 is 1, this means that the corresponding data byte of the data signal 402 should be received by the processing device, and when a bit value of a data bit in the Byte Enable signal 404 is 0, this means that the corresponding data byte of the data signal 402 should not be received by the processing device. It should be noted that utilizing the bits 0 and 1 to differ between receiving or not receiving the data byte is just an example and not a limitation of the present invention. It should be noted that, for the case of the Simple Byte Enable format, the setting of the four data bits 4042-4048 of the Byte Enable signal 404 can only correspond to a byte, a half-word (i.e., two bytes), or a word (i.e., fourth bytes) of the data signal 402, and for the case of the Complex Byte Enable format, the setting of the four data bits 4042-4048 of the Byte Enable signal 404 can correspond to any combination of bytes of the data signal 402. For example, the Simple Byte Enable signal 404 can be [0,0,0,1], [0,0,1,1], or [1,1,1,1], and the Complex Byte Enable signal 404 can be [0,1,1,1], [1,0,1,1], [1,1,0,1], or [1,1,1,0]. Furthermore, in the following paragraph, the property of Byte Enable of the first processing device 106 is compatible to the Simple Byte Enable format, and the property of Byte Enable of the second processing device 108 is compatible to the Complex Byte Enable format for brevity.

When the controlling apparatus 104 receives the predetermined output data generated by the decoder 1050, and the controlling apparatus 104 is going to generate the data signal 402 and the Byte Enable signal 404 shown in FIG. 4 to the second processing device 108, the state machine 1052 of the controlling circuit 1044 reads the second address range 40-ff of the Byte Enable property look-up table stored in the storage device 1042, then the state machine 1052 determines the property of Byte Enable of the second processing device 108 according to the second address range 40-ff. In this example, as the Byte Enable signal 404 is a Complex Byte Enable signal and the property of Byte Enable of the second processing device 108 is compatible with the Complex Byte Enable format, the state machine 1052 controls the controlling circuit 1044 to directly generate the following data to the BUS 102 after the property of the second processing device 108 is determined:

OC_MADDR:0x40;
OC_MDATA:32-bit;
OC_MADATABYTEEN:4'b1101;

wherein OC_MADDR:0x40 is the address where the data signal 402 is to be stored, OC_MDATA:32-bit is the bit length of the data signal 402, and OC_MADATABYTEEN:4'b1101 is the Byte Enable signal 404 corresponding to the data signal 402.

When the controlling apparatus 104 receives the predetermined output data generated by the decoder 1050, and the controlling apparatus 104 is going to generate the data signal 402 and the Byte Enable signal 404 shown in FIG. 4 to the first processing device 106, the state machine 1052 of the controlling circuit 1044 also reads the first address range 00-3f of the Byte Enable property look-up table stored in the storage device 1042, then the state machine 1052 determines the property of Byte Enable of the first processing device 106 according to the first address range 00-3f. In this example, as the Byte Enable signal 404 is a Complex Byte Enable signal and the property of Byte Enable of the first processing device 106 is compatible with the Simple Byte Enable format, the state machine 1052 controls the controlling circuit 1044 to divide the pre-transmitted data into a first transmitting data and a second transmitting data, and transmits the first transmitting data and the second transmitting data to the BUS 102 in different points in time after the property of the first processing device 106 is determined, wherein a first Byte Enable signal and a second Byte Enable signal corresponding to the first transmitting data and the second transmitting data respectively are the Simple Byte Enable format as shown below:

The first transmitting data transmitted in time t1:
OC_MADDR:0x00;
OC_MDATA:32-bit;
OC_MADATABYTEEN:4'b0001;

The second transmitting data transmitted in time t2:
OC_MADDR:0x02;
OC_MDATA:32-bit;
OC_MADATABYTEEN:4'b1100;
wherein OC_MADDR:0x00 is the address where the first transmitting data is to be stored, OC_MDATA:32-bit is the bit length of the first transmitting data, OC_MADATABYTEEN:4'b0001 is the first Byte Enable signal corresponding to the first transmitting data; OC_MADDR:0x02 is the address where the second transmitting data is to be stored, OC_MDATA:32-bit is the bit length of the second transmitting data, and OC_MADATABYTEEN:4'b1100 is the second Byte Enable signal corresponding to the second transmitting data. Therefore, when the first processing device 106 receives the first transmitting data and the second transmitting data at times t1 and t2 respectively, the first processing device 106 stores data in the first eight bits (i.e., 0-7 bits) of the data signal 402 into the address 0x00 according to the first Byte Enable signal, and stores data in the third eight bits (i.e., 16-31 bits) of the data signal 402 into the address 0x02 according to the second Byte Enable signal. Therefore, by applying the present controlling circuit 1044, the storage device 1042, and the related method, the controlling apparatus 104 is able to transmit the data signal 402 with the Complex Byte Enable signal to the first processing device 106 via the BUS 102, wherein the property of the first processing device 106 is compatible with the Simple Byte Enable. It should be noted that one of the features of the master controlling apparatus 104 is to automatically generate the Byte Enable signal compatible with the slave processing device. Therefore, a conventional converting circuit that is utilized to convert the Byte Enable signal into the compatible Byte Enable signal for the slave processing device can be saved. In other words, the present data transmitting system 100 at least saves the cost of manufacturing the conventional converting circuit. Furthermore, it should be noted that dividing the pre-transmitting data into two transmitting data is not a limitation of the disclosure; those skilled in the art will understand that dividing the pre-transmitting Byte Enable signal into any number of transmitting Byte Enable signals also belongs to the scope of the disclosure.

Briefly, the master controlling circuit determines the property of Byte Enable that can be received by the slave processing circuit according to the assigned address range corresponding to the slave processing circuit, and generates the corresponding property of Byte Enable signal to the slave processing circuit. Accordingly, the conventional converting circuit that is utilized to convert the Byte Enable signal into the compatible Byte Enable signal for the slave processing device can be saved, and thus the present data transmitting system at least claims the benefits of high integration, low cost, and high efficiency.

Those skilled in the art will readily observe that numerous modifications and alterations of the device and method may be made while retaining the teachings of the disclosure.

What is claimed is:

1. A controlling apparatus, comprising:
a storage device, arranged to store at least one Byte Enable property compatible with a processing device; and
a controlling circuit, coupled to the storage device, arranged to generate at least one Byte Enable signal to the processing device according to the Byte Enable property compatible with the processing device, wherein the storage device comprises a look-up table of the Byte Enable property, wherein the look-up table is configured to record an address range corresponding to the processing device or the Byte Enable property mapping to the address range, and wherein the controlling circuit reads out the Byte Enable property of the processing device from the look-up table according to the address range corresponding to the processing device.

2. The controlling apparatus of claim 1, wherein the controlling apparatus is a master device, and the processing device is a slave device.

3. The controlling apparatus of claim 1, wherein the Byte Enable property comprises a Complex Byte Enable format and a Simple Byte Enable format.

4. The controlling apparatus of claim 3, wherein when the controlling circuit determines that the Byte Enable property compatible with the processing device is the Complex Byte Enable format, and when the Complex Byte Enable format is the format ready to be transmitted to the processing device, the controlling circuit generates the Byte Enable signal with the Complex Byte Enable format to the processing device.

5. The controlling apparatus of claim 3, wherein when the Byte Enable property compatible with the processing device is the Simple Byte Enable format, and when the Simple Byte Enable format is the format ready to be transmitted to the processing device, the controlling circuit generates the Byte Enable signal with the Simple Byte Enable format to the processing device.

6. The controlling apparatus of claim 3, wherein when the controlling circuit determines that the Byte Enable property compatible with the processing device is the Complex Byte Enable format, and when the Simple Byte Enable format is the format ready to be transmitted to the processing device, the controlling circuit generates the Byte Enable signal with the Simple Byte Enable format to the processing device.

7. The controlling apparatus of claim 3, wherein when the controlling circuit determines that the Byte Enable property compatible with the processing device is the Simple Byte Enable format, and when the Complex Byte Enable format is the format ready to be transmitted to the processing device, the controlling circuit generates a plurality of Byte Enable signals with the Simple Byte Enable formats to the processing device according to the Complex Byte Enable format.

8. The controlling apparatus of claim 7, wherein the controlling circuit outputs each Byte Enable signal of the Byte Enable signals with the Simple Byte Enable formats in different points in time.

9. A data transmitting system, comprising:
a BUS;
a processing device, coupled to the BUS; and
a controlling apparatus, coupled to the BUS, wherein when the controlling apparatus determines that a Byte Enable property compatible with the processing device is a first Byte Enable format, and when a second Byte Enable format is the format ready to be transmitted to the processing device, the controlling apparatus generates a plurality of Byte Enable signals with the first Byte Enable formats to the processing device according to the second Byte Enable format.

10. The data transmitting system of claim 9, wherein the controlling apparatus outputs each Byte Enable signal of the Byte Enable signals with the first Byte Enable formats to the BUS in different points in time.

11. A controlling method, comprising:
arranging a storage device to store at least one Byte Enable property compatible with a processing device; and
generating at least one Byte Enable signal to the processing device according to the Byte Enable property compatible with the processing device, wherein the storage device comprises a look-up table of the Byte Enable property, wherein the look-up table is configured to record an address range corresponding to the processing device or the Byte Enable property mapping to the address range, and wherein generating the at least one Byte Enable signal to the processing device comprises reading the Byte Enable property of the processing device from the look-up table according to the address range corresponding to the processing device.

12. The controlling method of claim 11, wherein the Byte Enable property comprises a Complex Byte Enable format and a Simple Byte Enable format.

13. The controlling method of claim 12, wherein when the Byte Enable property compatible with the processing device is the Complex Byte Enable format, and when the Complex Byte Enable format is the format ready to be transmitted to the processing device, then the step of generating the Byte Enable signal to the processing device according to the Byte Enable property compatible with the processing device comprises:
   generating the Byte Enable signal with the Complex Byte Enable format to the processing device.

14. The controlling method of claim 12, wherein when the Byte Enable property compatible with the processing device is the Simple Byte Enable format, and when the Simple Byte Enable format is the format ready to be transmitted to the processing device, then the step of generating the Byte Enable signal to the processing device according to the Byte Enable property compatible with the processing device comprises:
   generating the Byte Enable signal with the Simple Byte Enable format to the processing device.

15. The controlling method of claim 12, wherein when the Byte Enable property compatible with the processing device is the Complex Byte Enable format, and when the Simple Byte Enable format is the format ready to be transmitted to the processing device, then the step of generating the Byte Enable signal to the processing device according to the Byte Enable property compatible with the processing device comprises:
   generating the Byte Enable signal with the Simple Byte Enable format to the processing device.

16. The controlling method of claim 12, wherein when the Byte Enable property compatible with the processing device is the Simple Byte Enable format, and when the Complex Byte Enable format is the format ready to be transmitted to the processing device, then the step of generating the Byte Enable signal to the processing device according to the Byte Enable property compatible with the processing device comprises:
   generating a plurality of Byte Enable signals with the Simple Byte Enable formats to the processing device according to the Complex Byte Enable format.

17. The controlling method of claim 16, wherein the step of generating the Byte Enable signals with the Simple Byte Enable formats to the processing device according to the Complex Byte Enable format further comprises:
   outputting each Byte Enable signal of the Byte Enable signals with the Simple Byte Enable formats in different points in time.

* * * * *